US007823117B1

(12) United States Patent
Bennett

(10) Patent No.: US 7,823,117 B1
(45) Date of Patent: Oct. 26, 2010

(54) SEPARATING A HIGH-LEVEL PROGRAMMING LANGUAGE PROGRAM INTO HARDWARE AND SOFTWARE COMPONENTS

(75) Inventor: David W. Bennett, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 209 days.

(21) Appl. No.: 12/004,834

(22) Filed: Dec. 21, 2007

(51) Int. Cl.
*G06F 17/50* (2006.01)
(52) U.S. Cl. .................... 716/18; 716/16; 703/13
(58) Field of Classification Search .............. 716/16, 716/18; 703/13
See application file for complete search history.

(56) References Cited

U.S. PATENT DOCUMENTS

| 5,539,911 | A | * | 7/1996 | Nguyen et al. | 712/23 |
| 5,819,064 | A | * | 10/1998 | Razdan et al. | 703/27 |
| 5,870,588 | A | * | 2/1999 | Rompaey et al. | 703/13 |
| 6,205,199 | B1 | * | 3/2001 | Polichar et al. | 378/98.8 |
| 6,477,683 | B1 | * | 11/2002 | Killian et al. | 716/1 |
| 6,606,588 | B1 | * | 8/2003 | Schaumont et al. | 703/15 |
| 7,199,608 | B1 | * | 4/2007 | Trimberger | 326/38 |
| 7,222,314 | B1 | * | 5/2007 | Miller et al. | 716/3 |
| 7,228,531 | B1 | * | 6/2007 | Langhammer | 717/146 |
| 7,240,303 | B1 | * | 7/2007 | Schubert et al. | 716/4 |
| 7,243,330 | B1 | * | 7/2007 | Ganesan et al. | 716/18 |
| 7,315,991 | B1 | | 1/2008 | Bennett | |
| 7,340,693 | B2 | * | 3/2008 | Martin et al. | 716/1 |
| 7,478,031 | B2 | * | 1/2009 | Master et al. | 703/22 |
| 7,490,302 | B1 | * | 2/2009 | Rahman et al. | 716/1 |
| 2004/0139411 | A1 | * | 7/2004 | Smith et al. | 716/7 |
| 2006/0190905 | A1 | * | 8/2006 | Martin et al. | 716/18 |
| 2008/0082786 | A1 | * | 4/2008 | Lovell | 712/15 |

OTHER PUBLICATIONS

U.S. Appl. No. 11/197,936, filed Aug. 5, 2005, Tuan et al., entitled "A Programmable Logic Device (PLD) with Memory Refresh Based On Single Event Upset (SEU) Occurrence to Maintain Soft Error Immunity", Xilinx, Inc., 2100 Logic Drive, CA.
James-Roxby et al., entitled "Time-Critical Software Deceleration in an FCCM'", Proceedings of the 12th Annual IEEE Symposium on Field-Programmable Custom Computing Machines (FCCM'04), Apr. 20-23, 2004, ISBN: 0-7695-2230-0,10 pages, Xilinx, Inc., 2100 Logic Drive, San Jose, CA.
Keller et al., entitled "Software Decelerators", 13th International Field Programmable Logic and Applications Conference (FPL). Lisbon, Portugal, Sep. 1-3, 2003. Lecture Notes in Computer Science 2778. 10 pgs., Xilinx, Inc., 2100 Logic Drive, San Jose, CA.

* cited by examiner

*Primary Examiner*—Naum B Levin
(74) *Attorney, Agent, or Firm*—LeRoy D. Maunu

(57) ABSTRACT

Various approaches are described for implementing a high-level programming language program in hardware and software components. In one approach, a method comprises compiling the high-level programming language program into a target language program that includes a plurality of functional elements. Execution of the target language program is profiled to obtain execution counts of the functional elements. A subset of the functional elements are selected for implementation in programmable resources of a programmable device based on the profile data and availability of programmable resources. A bitstream is generated to implement a first sub-circuit that performs functions of the subset of functional elements, and the subset of functional elements is removed from the target language program. The programmable device is configured with the bitstream. The target language program is provided for execution by a processor.

18 Claims, 10 Drawing Sheets

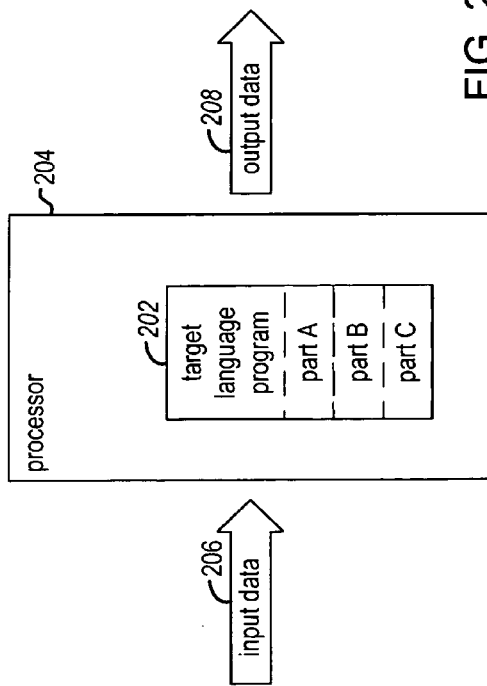
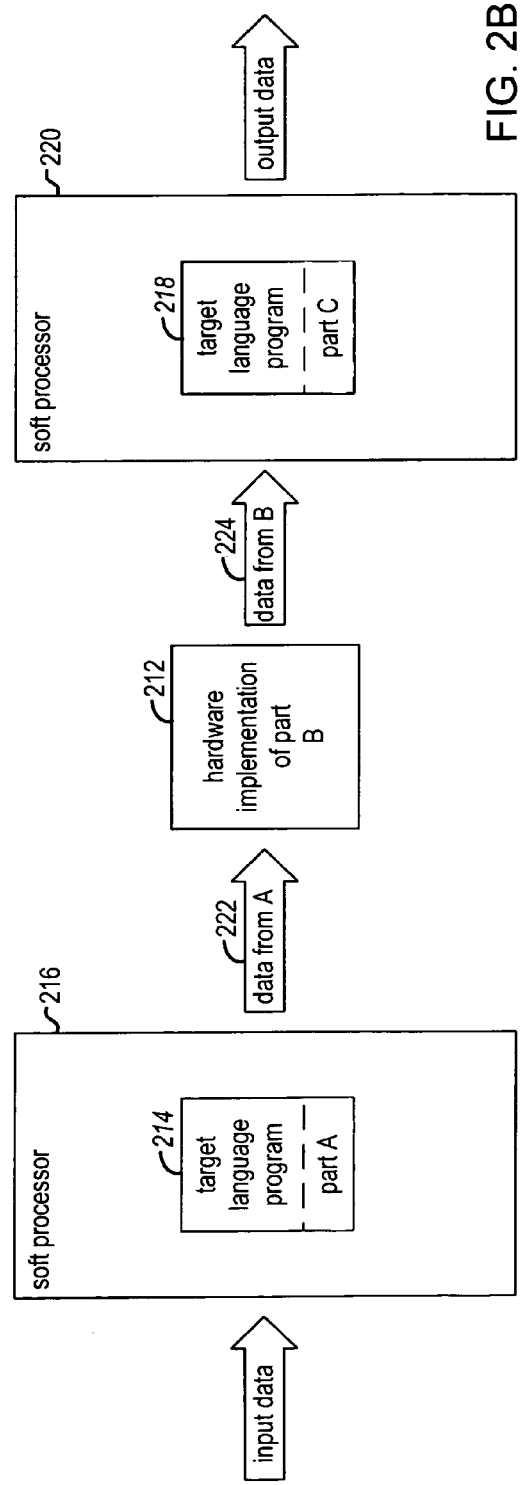

| | | |
|---|---|---|
| NEND.testfgemm.l3.63 | 1 | |
| MULTIPLY.testfgemm.43 | 1 | |
| NEND.testfgemm.l2.55 | 1 | |
| NEND.fgemm.l1.35 | 1 | |
| NEND.testfgemm.l4.72 | 1 | |
| ADD.fgemm.b0.30 | 49 | |
| NFOR.testfgemm.l3.56 | 50 | |
| NWAIT.testfgemm.l3.b._mem_sync | 50 | |
| MULTIPLY.testfgemm.l3.b.59 | 50 | |
| ADD.testfgemm.l3.b.60 | 50 | |
| ADD.testfgemm.l3.b.61 | 50 | |
| MEMWRITE.testfgemm.l3.b.62 | 50 | |
| NFOR.testfgemm.l2.44 | 2500 | |
| NWAIT.testfgemm.l2.b._mem_sync | 2500 | |
| ADD.testfgemm.l2.b.47 | 2500 | |
| I2F.testfgemm.l2.b.48 | 2500 | |
| I2F.testfgemm.l2.b.49 | 2500 | |
| FADD.testfgemm.l2.b.50 | 2500 | |
| I2F.testfgemm.l2.b.51 | 2500 | |
| FADD.testfgemm.l2.b.52 | 2500 | |
| FDIVIDE.testfgemm.l2.b.53 | 2500 | |
| MEMWRITE.testfgemm.l2.b.54 | 2500 | |
| NFOR.fgemm.l1.19 | 2500 | |
| NWAIT.fgemm.l1.b._mem_sync | 2500 | |
| NWAIT.fgemm.l1.b.ro | 2500 | |
| ADD.fgemm.l1.b.21 | 2500 | |
| ADD.fgemm.l1.b.22 | 2500 | |
| MEMREAD.fgemm.l1.b.23 | 2500 | |
| ADD.fgemm.l1.b.24 | 2500 | |
| NEND.innerloop.l0.13 | 2500 | |
| SUB.fgemm.l1.b.26 | 2500 | |
| CMP.fgemm.l1.b.27 | 2500 | |
| DEMUX.fgemm.l1.b.m0.28 | 2500 | |
| MUX.fgemm.l1.b.m0.34 | 2500 | |
| NFOR.testfgemm.l4.67 | 2500 | |
| NWAIT.testfgemm.l4.b._mem_sync | 2500 | |
| NWAIT.testfgemm.l4.b.f | 2500 | |
| ADD.testfgemm.l4.b.69 | 2500 | |
| MEMREAD.testfgemm.l4.b.70 | 2500 | |
| FADD.testfgemm.l4.b.71 | 2500 | |
| NFOR.innerloop.l0.3 | 125000 | |
| ADD.innerloop.l0.b.6 | 125000 | |
| MEMREAD.innerloop.l0.b.7 | 125000 | |
| ADD.innerloop.l0.b.8 | 125000 | |
| MEMREAD.innerloop.l0.b.9 | 125000 | |
| FMULTIPLY.innerloop.l0.b.10 | 125000 | |
| FADD.innerloop.l0.b.11 | 125000 | |

FIG. 4

```
int result;
if (a==b)
        result=dosomething();
else
        result=somethingelse();
```

```
reg     tmp,res
add     a,-b;tmp
demux   m1;tmp;b0;b1
unreg   tmp branch  b0
call    dosomething;a,b;res
unbranch b0 branch  b1
call    somethingelse;a,b;res
unbranch b1;a,b,res mux     m1
```

SEPARATING A HIGH-LEVEL PROGRAMMING LANGUAGE PROGRAM INTO HARDWARE AND SOFTWARE COMPONENTS

FIELD OF THE INVENTION

The present invention generally relates to tools for implementing an electronic circuit design, and more particularly to methods and apparatus for implementing an electronic circuit design that is specified in a high-level programming language.

BACKGROUND

Programmable logic devices (PLDs) such as field programmable gate arrays (FPGAs) and complex programmable logic devices (CPLDs) are becoming increasingly popular as a circuit technology for a variety of applications. Attributes of reconfigurability and shortened design-to-implementation time in many instances may provide competitive advantages.

Traditionally, designs for electronic circuits have been specified using a hardware description language (HDL) such as Verilog or VHDL. HDLs allow circuit designers to design and document electronic systems at various levels of abstraction. Designs for programmable logic devices (PLDs), such as field programmable gate arrays (FPGAs) and application specific integrated circuits (ASICs), can be modeled using an HDL. The design then can be simulated and tested using appropriate software-based design and/or synthesis tools.

One recent trend in circuit design has been to use high-level programming languages (HLLs) to design electronic circuits. For example, a circuit design can be specified initially as a program written in an HLL such as Fortran, C/C++, JAVA, or the like. This approach allows a developer to concentrate on an algorithmic solution to a problem rather than the specific hardware involved. A variety of different tools are available which effectively translate the HLL program into a synthesizable netlist or other software-based circuit representation.

In some instances the design may be too large to be implemented on a particular PLD. The designer may choose to implement part(s) of the design in programmable logic resources of the PLD and another part(s) of the design on a processor. For some PLDs, such as some Virtex FPGAs from XILINX, Inc., both an on-chip, hardwired processor and one or more soft processors are available for executing software. A soft processor is one that is implemented in the programmable logic resources of the PLD.

Analysis, selection, and implementation of the design in hardware and software parts may be difficult and costly. The designer may be confronted with balancing performance of the implemented design against the hardware resources available to implement the design. The resources available on the device, the impact different parts of the design have on overall performance, and an effective separation of hardware-implemented and software-implemented parts all must be considered separating the design into hardware and software components. The present invention may address one or more of the above issues.

SUMMARY

The various embodiments of the invention provide methods and apparatus for implementing a high-level programming language program in hardware and software components. In one embodiment, a method comprises compiling the high-level programming language program into a target language program that includes a plurality of functional elements. Execution of the target language program is provided, and profile data that specifies respective execution counts of the functional elements is stored. A subset of the functional elements is selected for implementation in programmable logic of a programmable logic device (PLD) based on the profile data and availability of PLD programmable logic resources to implement functions of the subset of functional elements. A bitstream that implements a first sub-circuit that performs functions of the subset of functional elements is generated, and the subset of functional elements is removed from the target language program. The PLD is configured with the bitstream. After the removing step, the target language program is provided for execution by a processor.

In another embodiment, an apparatus is provided for implementing a high-level programming language program in hardware and software components. The apparatus comprises means for compiling the high-level programming language program into a target language program that includes a plurality of functional elements; means for profiling execution of the target language program and storing profile data that specifies respective execution counts of the functional elements; means for selecting a subset of the functional elements for implementation in programmable logic of a programmable logic device (PLD) based on the profile data and availability of PLD programmable logic resources to implement functions of the subset of functional elements; means for generating a bitstream that implements a first sub-circuit that performs functions of the subset of functional elements; means for removing the subset of functional elements from the target language program; means for configuring the PLD with the bitstream; and means, responsive to completion of the removing step, for providing the target language program for execution by a processor.

An article of manufacture comprising a processor-readable medium is provided in another embodiment. The processor-readable medium is configured with processor-executable instructions for causing one or more processors to implement a high-level programming language program in hardware and software components by performing a series of steps, including compiling the high-level programming language program into a target language program that includes a plurality of functional elements; profiling execution of the target language program and storing profile data that specifies respective execution counts of the functional elements; selecting a subset of the functional elements for implementation in programmable logic of a programmable logic device (PLD) based on the profile data and availability of PLD programmable logic resources to implement functions of the subset of functional elements; generating a bitstream that implements a first sub-circuit that performs functions of the subset of functional elements; removing the subset of functional elements from the target language program; configuring the PLD with the bitstream; and after the removing step, providing the target language program for execution by a processor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIGS. 2A and 2B illustrate how a design running as software may be partitioned into two software portions on two soft processors and a hardware component between the two software components;

FIG. 4 shows a table having names of functional elements of a target language program and corresponding execution counts determined during profiling;

DETAILED DESCRIPTION OF THE DRAWINGS

Figure 1:
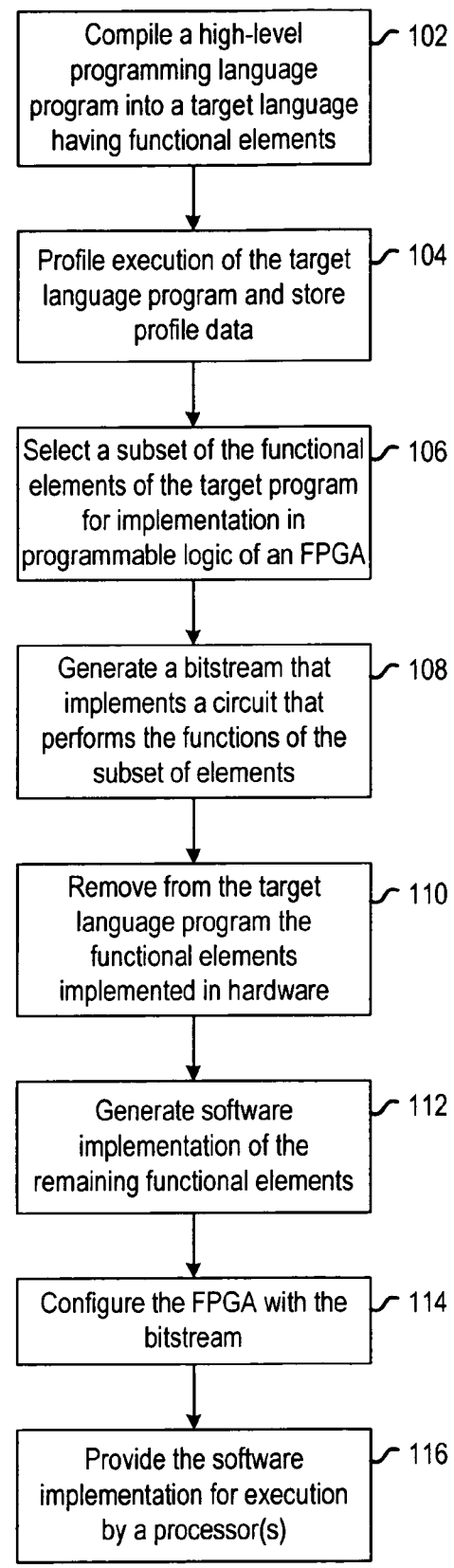
FIG. 1 is a flowchart of a high-level process for implementing a high-level programming language specification of a design in hardware and software components in accordance with an embodiment of the invention.

The various embodiments of the invention provide a method and system for implementing a design, which is initially specified in a high-level programming language, in hardware and software components. The initial specification is compiled into target code, and that target code is instrumented during execution by a processor or interpretation by an interpreter. Instrumenting code is also sometimes referred to as "profiling." Whether the code is executed or interpreted is governed by whether the target language is compatible for execution by processor or is an interpreted language. Those skilled in the art will recognize that simulation tools may be used to instrument the code if the target language program is generated by conventional hardware design tools.

After having applied an application-suitable set of input data, live or simulated, to the target code during instrumentation, the process proceeds to analyze the instrumentation data to determine which functional elements in the target code should be implemented in hardware and which should be implemented in software. Those functional elements, for example, instructions, callable functions, etc., in the target code that the instrumentation data indicates that the design spends a significant amount of its processing time executing are automatically identified and implemented as hardware components. In one embodiment, the functional elements in the target language are associated with specific hardware specifications from a library that may be combined and transformed into a hardware implementation for a PLD.

The subset of functional elements are removed from the target language program, and the remaining functional elements are implemented as a software portion of the design. The software portion may remain in the target language, or the target language may be compiled into machine instructions that are executable by a particular processor.

The process may be either "static" or "dynamic." In the static approach, the target language code may be executed by a simulator that is running on a processor that is off-PLD. While executing the target code, the target code is profiled while the user provides a data set for input during the simulation. Upon completion, the profile data is analyzed. A hardware implementation is generated for code for which the profile data indicates that a hardware implementation is appropriate.

In the dynamic approach, the intermediate code may be executed by a simulator that is running on a soft processor implemented on a PLD or on a hard processor that is integrated with PLD resources on a chip. The system is operating in a live environment with live input data, and the executing target code is profiled. At an application-suitable time during execution, the profile data is analyzed. A hardware implementation is generated for a selected portion of the target code based on the profile data. Operation of the system or a portion thereof is suspended, and the PLD is partially reconfigured with the hardware implementation The portion of the target code now implemented in hardware is removed, so that it is no longer executed. After reconfiguration, the system operation may be resumed.

FIG. 1 is a flowchart of a high-level process for implementing a high-level programming language specification of a design in hardware and software components in accordance with an embodiment of the invention. At step 102, a high-level programming language program is compiled into a target language having functional elements. The high-level programming language may be standard or proprietary, depending on user requirements. Example standard languages include C, C++, Fortran, and many others known to those skilled in the art. In an example embodiment, the target language is referred to as the CHiMPS Target Language (CTL), which is described in the latter parts of this specification. Generally, each instruction in the CTL may be converted into an instance of a predefined hardware module. In alternative embodiments, the target language may be a hardware description language (HDL) or a schematic implementation depending on the availability of suitable simulators with profiling capabilities.

Data manipulated by a CTL instruction is held in a register, and when the instruction is implemented in hardware, the registers are implemented as input and output first-in-first-out buffers ("FIFOs"). The hardware implementation of a CTL instruction generally waits for available data in the input FIFO(s), then performs the operation and sends results to output FIFO(s), which provide input to the next instruction (s), thereby creating a pipeline.

The general process next profiles execution of the target language program and stores the resulting profile data at step 104. As indicated above, the profiling of the design may be static or dynamic. Profiling the execution of a software design generally entails executing the software in an environment in which all or selected portions of the software are designated for profiling. A custom built or a generally available profiler, for example, the gprof Unix tool, may be used to gather the desired information. One of the capabilities of the profiler tool is to count the number of times instructions or callable functions are executed. Some tools allow the user to target certain instructions or functions for profiling. In one embodiment, these execution counts are stored in association with the target language instructions for subsequent processing.

At step 106, the process selects a subset of the functional elements of the target program for implementation in programmable logic of a PLD. The subset of functional elements will generally be one or more groups of instructions. For example, a group of instructions may include those generated for a "for" or "while" loop of source program code. The selection depends on the desired performance and the available hardware resources. A greater quantity of hardware resources that are available implies that a greater portion of the software may be implemented in hardware. Fewer hardware resources means implementing a lesser portion of the software in hardware. Parts of the design that are executed more frequently according to the profile data may be selected for implementing in hardware over parts of the design that are executed less frequently.

A configuration bitstream is generated at step 108 to implement the functions of those functional elements (e.g., CTL instructions) selected for implementation in hardware. As indicated above, each CTL instruction may have a predefined specification of a hardware module. The specification may be in the form of a netlist to be placed and routed and to have a configuration bitstream generated therefrom. Standard tools may be used to place and route the netlist and generate the bitstream.

At step 110, those functional elements that have been implemented in hardware are removed from the target language program. In place of those instructions implemented in hardware and removed from the program, FIFO-read and FIFO-write instructions are inserted according to the requirements of the replaced instructions. For example, the MICROBLAZE processor implementation from XILINX supports the needed FIFO-read and FIFO-write instructions. At step 112, a software implementation of the remaining functional elements is generated.

The modified design may then be deployed as shown by steps 114 and 116. The PLD is configured with the bitstream, and the software implementation is provided for execution by one or more processors. The final implementation may use one or more soft processors implemented on the PLD, a hard processor disposed on the PLD and coupled to the programmed logic and interconnect resources, or various combinations thereof.

FIGS. 2A and 2B illustrate how a design running as software may be partitioned into two software portions on two soft processors and a hardware component between the two software components. In FIG. 2A, a design is implemented entirely as a target language program 202 that executes on a processor 204. The program has three example functional elements designated as parts A, B, and C. The number of program parts shown is limited to three for ease of illustration. It will be appreciated that an actual program may include many more than the three illustrated parts. The general set of input data to the program 202 is designated as arrow 206, and the general set of output data from the program is designated as 208.

In the computing environment of FIG. 2A, the program 202 is executed and profiled in order to determine the execution counts of the instructions. The profiling may be performed in a live operating environment or in a simulation, depending on user requirements. The processor may be a standalone processor, or a hard or soft processor on a PLD, again depending on user requirements.

The functional block diagram of FIG. 2B shows that part B of the target language program 202 from FIG. 2A has been selected and implemented as a hardware component 212. The data flow demonstrates that relative to parts A, B, and C in the program 202, the order in which data flows through the system is from part A to part B and from part B to part C. With part B implemented in hardware, part A may remain as program code 214 that is executed on a first soft processor 216, and part C may remain as program code 218 that is executed on a second soft processor 220. In an alternative embodiment, parts A and B may be implemented as program parts running a single hard or soft processor.

The hardware implementation 212 of part B may embodied in the programmable resources of a PLD. The hardware implementation 212 includes at least one FIFO (not shown) for receiving data 222 from the part A program 214 and at least one FIFO (not shown) for outputting data 224 to the part C program 218. The parts A and B programs will be modified relative to the program 202 to include calls to the appropriate device drivers for writing to and reading from the FIFOs.

Implementing the part A program 214 in one processor, part B in hardware 212, and the part C program 218 in another processor may improve the performance over the original program 202 by performing the functions of part B at hardware speed versus software speed. Also, the pipelining of operations performed by parts A, B, and C may further increase performance.

Figure 3:
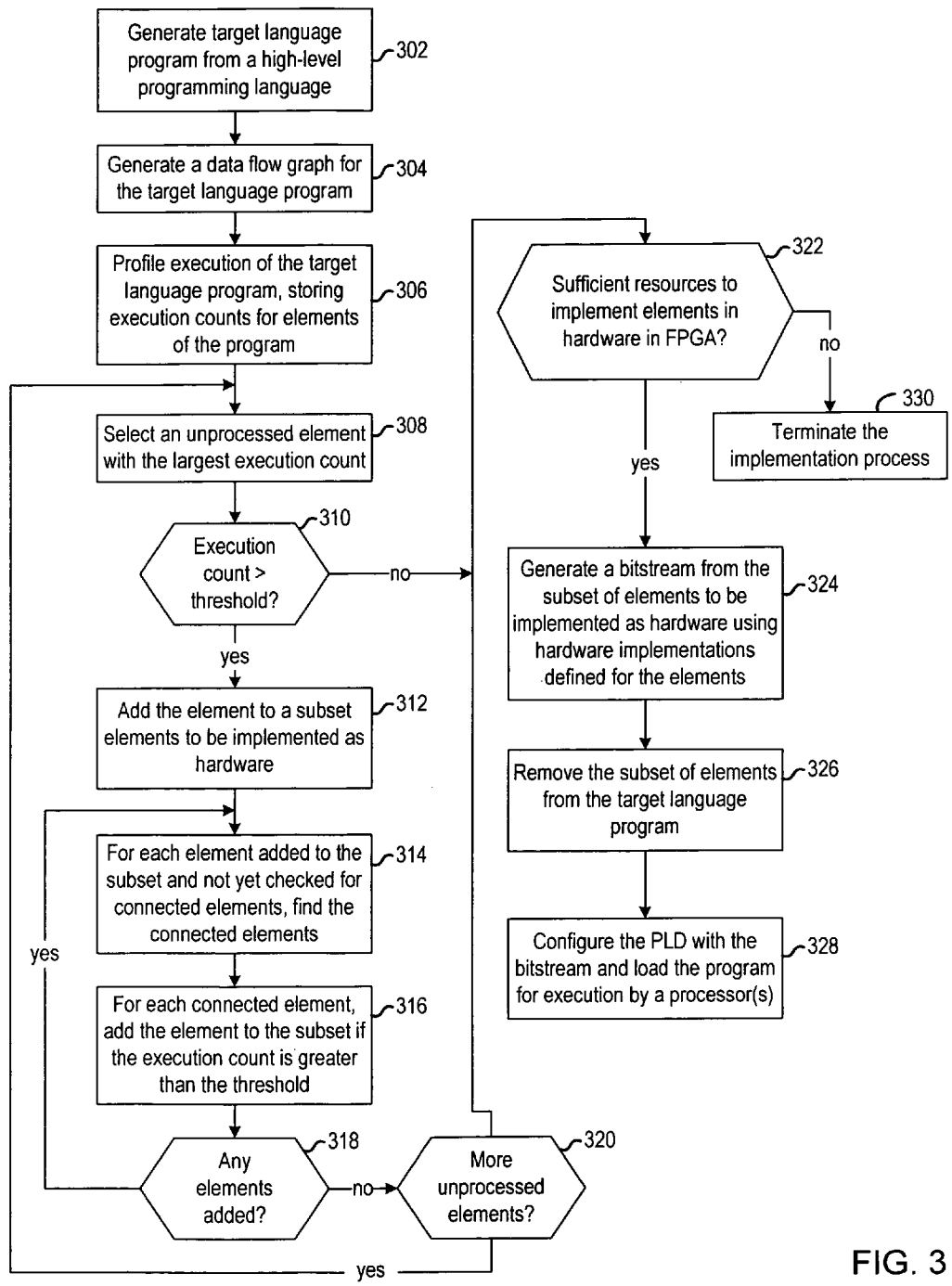
FIG. 3 is a flowchart of a process for implementing a high-level programming language specification of a design in hardware and software components in accordance with other embodiments of the invention.

FIG. 3 is a flowchart of a process for implementing a high-level programming language specification of a design in hardware and software components in accordance with other embodiments of the invention. At step 302, the process generates a target language program from a high-level programming language program as discussed above. Table 1 is an example of a C language program.

TABLE 1

```
void innerloop(float* arow, float b, float* crow, long len)
{
    long j;
    for (j = 0; j < len; j++)
        crow[j] += arow[j] * b;
}
void fgemm(float* a, float* b, float* c, long len, long sq)
{
    long ro = 0; // offset to start of row
    long i;
    for (i = 0; i < sq; i++)
    {
        innerloop(a+ro, b[i], c+ro, len);
        if (i - ro == len)
            ro += len;
    }
}
float testfgemm(float* d, float* q, float* s, long len)
{
    long i, sq;
    float f;
    // Build d matrix
    sq = len*len;
    for (i = 0; i < sq; i++)
        d[i] = ((float)i + sq) / ((float)i + len);
    // Build identity matrix
    for (i = 0; i < len; i++)
        q[i * len + i] = 1;
    fgemm(d, q, s, len, sq);
    f = 0;
    for (i = 0; i < sq; i++)
        f += s[i];
    return f;
}
```

Figure 5:
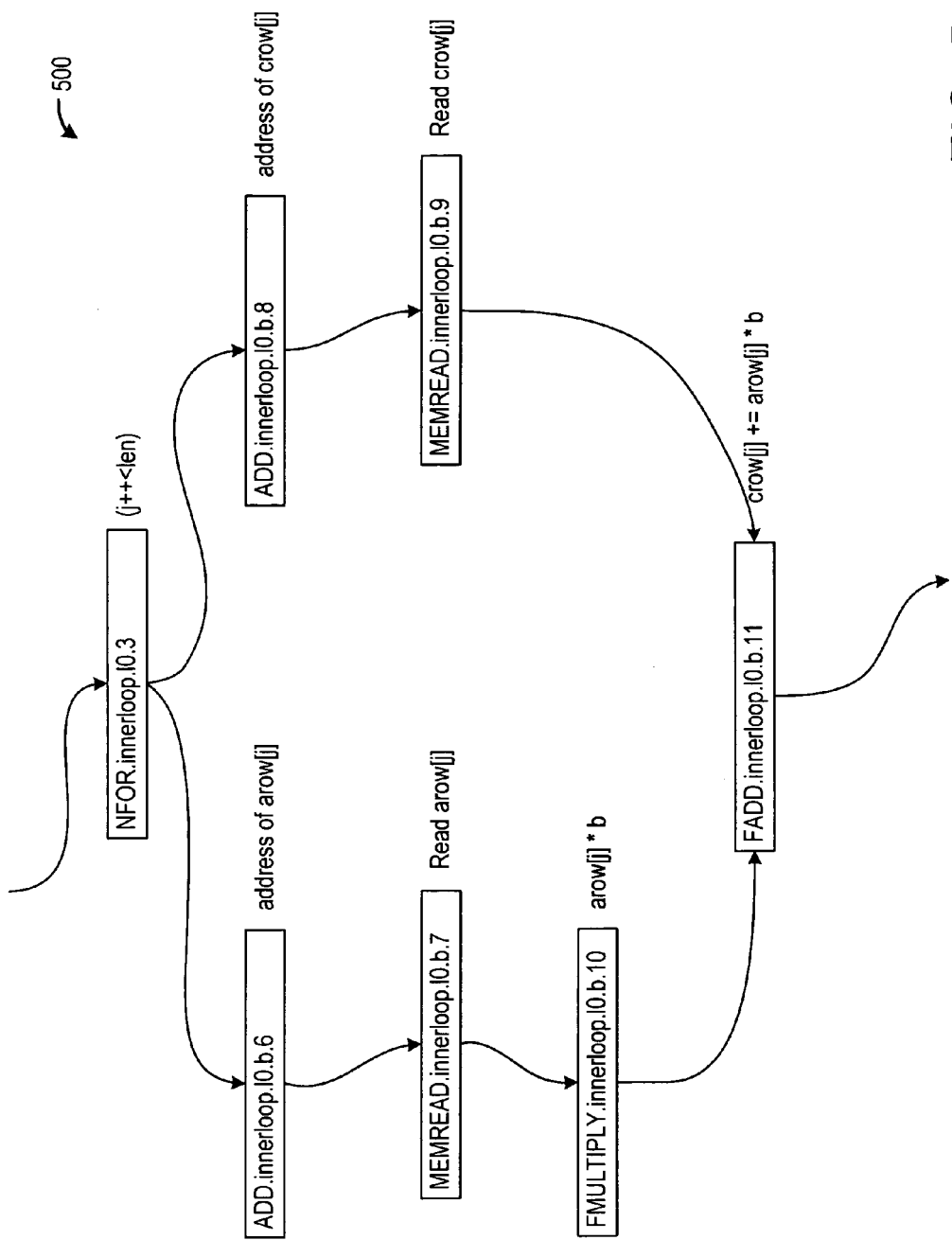
FIG. 5 is a partial data flow graph for the functional elements named in the table of FIG. 4.

In conjunction with the target language program, a data flow graph for the target language program is generated at step 304. Note that FIG. 5 shows a partial data flow graph for the resulting CTL program and is referenced later in the process as an example of CTL instructions selected for implementing in hardware.

At step 306, execution of the target language program is profiled and execution counts of the instructions are stored in association with the instructions. Referring briefly to FIG. 4, a table 400 illustrates functional elements of the target language program generated from the example source code of Table 1 and corresponding execution counts determined during profiling. Each row in the table includes one CTL instruction and the corresponding execution count. It may be recognized that the general format of a CTL instruction in the table provides multiple fields, each separated by a period. The fields include: the instruction name, the name of the function from the source code having the instruction from which the CTL instruction was generated, a source code line number, and other information. Further details pertaining to CTL instructions are provided later in this specification.

Once the target language program has been profiled, the selection of parts of the program for implementing in hardware may commence. At step 308, the process selects an unprocessed element with the largest execution count. In table 400 (see FIG. 4), FADD.innerloop.I0.b.11 is the last entry and has the greatest execution count. In one embodiment, an execution count threshold value may be used as a first level of control over whether a program element will be implemented in hardware. The particular value is implementation dependent. If the execution count exceeds the threshold value at decision step 310, the process proceeds to step 312, and the functional element is added to the subtet of elements to be further considered for implementing in hardware.

Steps 314, 316, and 318 use the data flow graph generated in step 304 to determine which elements connected to the element added at step 312 should also be added to the set of elements for further consideration. If, for example, FADD.innerloop.I0.b.11 is the first element added to the subset, those elements connected to FADD.innerloop.I0.b.11 are checked. At step 314, the process determines from the flow graph those elements that are connected to each added element. For example, on the first iteration FADD.innerloop.I0.b.11 was added to the subset, and the process finds that FMULTIPLY.innterloop.I0.b.10 and MEMREAD.innterloop.I0.b.9 are connected to the FADD.innerloop.I0.b.11 element, as shown by FIG. 5. For each connected element, if the execution count is greater than the threshold value, the connected element is also added to the subset at step 316. If the threshold value is 50,000, for example, then both FMULITPLY.innterloop.I1.b.10 and MEMREAD.innerloop.I0.b.9 are added, since their executions counts are 125,000. If any elements were added, as determined in decision step 318, the process returns to step 314 to check for elements connected to the just added element (s). MEMREAD.innerloop.I0.b.7 is then added as being connected to FMUULTIPLY.innerloop.I0.b.10 and having an execution count of 125,000, and ADD.innerloop.I0.b.8 is added as being connected to MEMREAD.innerloop.I0.b.9 and having an execution count of 125,000. ADD.innerloop.I0.b.6 and NFOR.innerloop.I0.3 are similarly added to the subset of elements. NFOR.innerloop.I0.3 would be the last element added since the remaining functional elements in the table 400 have execution counts less than 50,000.

Once no more connected elements have been added to the subset of elements, decision step 318 directs the process to decision step 320 to check whether there are additional functional elements in the program to be considered for adding to the subset. In the example, table 400 shows that there are unprocessed elements beyond those named above. Thus, the process would return to step 308 to select an unprocessed element. If the next selected element was FADD.testfgemm.I4.b.71, for example, the process would find that the execution count is less than the example threshold value of 50,000, and decision step 310 directs the process to decision step 322.

Decision step 322 determines whether there are sufficient resources to implement the subset of functional element in hardware of the target device, for example a PLD. Since each CTL instruction has a corresponding pre-defined hardware description, the quantity of PLD resources the CTL instruction would require when implemented in hardware may also be predetermined. It will be appreciated that different resources and quantities may be consumed on different types of PLDs.

If there are sufficient resources, at step 324 the process generates a configuration bitstream for a PLD from the subset of functional elements to be implemented in hardware. At step 326 the process removes the subset of elements from the target language program.

In generating the configuration bitstream, it will be appreciated that multiple soft processors may be specified by the bitstream, along with the circuit implementation of the CTL instructions. As shown in FIG. 2, where hardware is generated for part B of a program and that part inputs data from part A and outputs data to part C, parts A and C are implemented on soft processors. Thus, the generated configuration bitstream may configure multiple soft processors depending on the program data flow and hardware resource availability.

At step 328, the PLD is configured with the bitstream and the one or more remaining program parts are loaded for execution by one or more soft processors.

If at step 322 there are not sufficient resources to implement the subset of functional elements in hardware, then the implementation process may terminate at step 330. In an alternative embodiment, if there are insufficient hardware resources to implement all the elements in the subset but there are sufficient resources to implement some of the elements, the process may delineate between groups of related elements in the subset under consideration and select only a group from within the subset.

Figure 6:
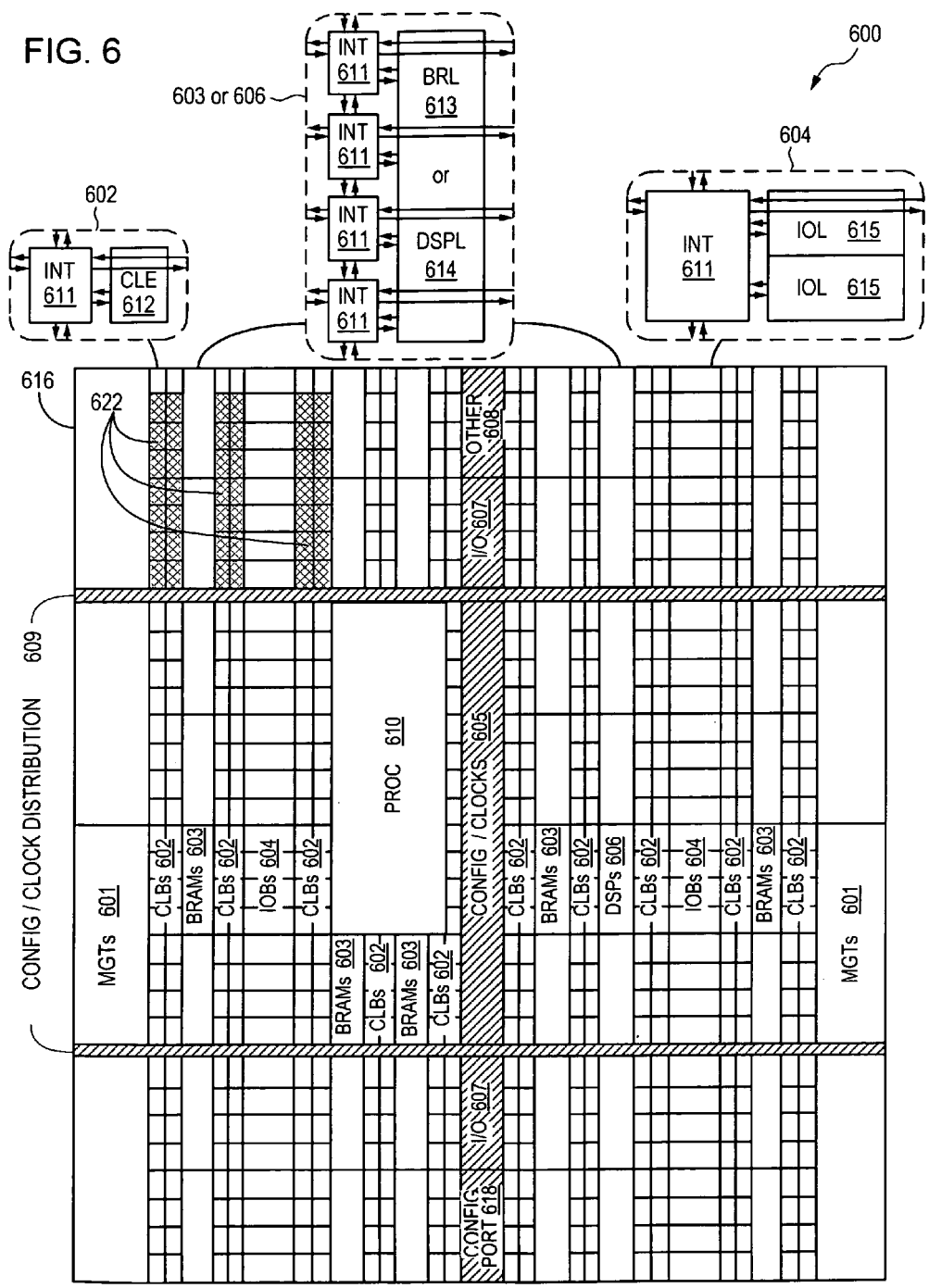
FIG. 6 illustrates an example FPGA architecture.

One type of PLD to which these methods can be applied is the field programmable gate array (FPGA). FIG. 6 illustrates an example FPGA architecture 600 on which a system may be implemented using the various approaches described herein. FPGA 600 includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include a hardwired processor 610.

In some FPGAs, each programmable tile includes a programmable interconnect element (INT 611) having standardized connections to and from a corresponding interconnect element in each adjacent tile. Therefore, the programmable interconnect elements taken together implement the programmable interconnect resources for the illustrated FPGA. The programmable interconnect element (INT 611) also includes the connections to and from the programmable logic primitive within the same tile, as shown by the examples included at the top of FIG. 6.

For example, a CLB 602 can include a configurable logic primitive (CLE 612) that can be programmed to implement user logic plus a single programmable interconnect element (INT 611). A BRAM 603 can include a BRAM logic primitive (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic primitive (DSPL 614) in addition to an appropriate number of programmable interconnect elements. An IOB 604 can include, for example, two instances of an input/output logic primitive (IOL 615) in addition to one instance of the programmable interconnect element (INT 611). As will be clear to those of skill in the art, the actual I/O pads connected, for example, to the I/O logic primitive 615 are manufactured using metal layered above the various illustrated logic blocks, and typically are not confined to the area of the input/output logic primitive 615.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Configuration port 618 may be used to access configuration memory in the FPGA 616 to configure the programmable logic and interconnect resources. In one embodiment, an internal scrubber (not shown) may continuously read and correct configuration memory via an internal configuration access port.

The cross-hatched gray boxes referenced by 622 illustrate a soft processor implemented on programmable logic resources of the FPGA. Note that the soft processor may occupy more or fewer CLBs than the number shown.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

Figure 7:
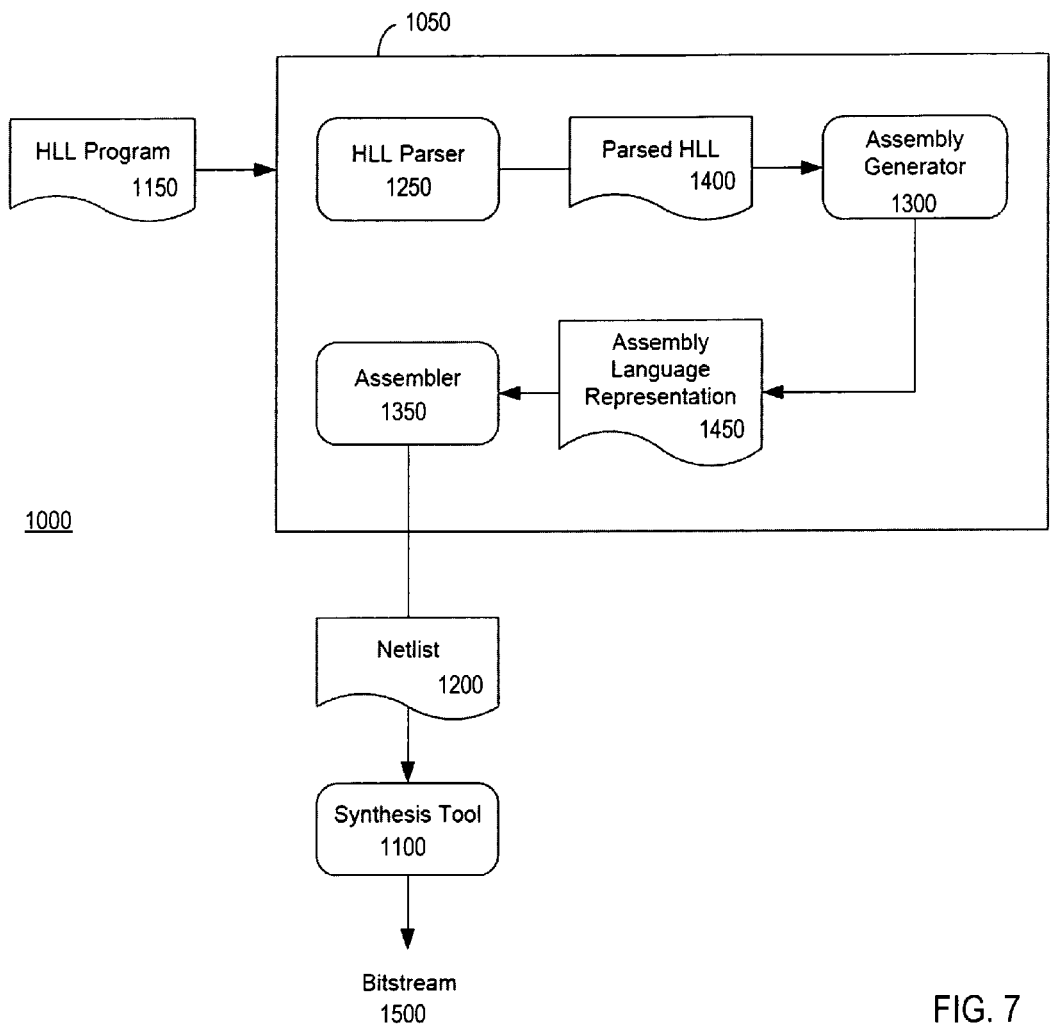
FIG. 7 is a schematic diagram illustrating a system for generating a circuit design from a high level programming language (HLL) program in accordance with the inventive arrangements disclosed herein.

FIG. 7 is a schematic diagram illustrating a system 1000 for generating a hardware description of a circuit design from an HLL program. As shown, the system can include a compiler 1050 and a synthesis tool 1100. System 1000 can be implemented as a collection of one or more computer programs executing within a suitable information processing system, for example.

In general, the compiler 1050 can translate an HLL program 1150 to a netlist 1200 or other hardware description of a circuit design. The compiler 1050 receives HLL program 1150 as input and provides netlist 1200 as output. The functionality of the circuit to be developed is embodied by the HLL program 1150. That is, the HLL program 1150 is an HLL representation of the circuit. As known, the HLL program 1150 can be implemented using any of a variety of different HLLs, whether Fortran, C/C++, JAVA, or the like. It should be appreciated that the particular HLL used is not intended to limit the scope of the present invention. Rather, any of a variety of different HLLs can be used.

According to one embodiment of the present invention, compiler 1050 can include several different components that facilitate the translation of HLL program 1150 to the netlist 1200. Compiler 1050 can include an HLL parser 1250, an assembly generator 1300, and an assembler 1350. The HLL parser 1250 can be implemented as any of a variety of commercially available parsers or as a parser offered under, or from, the GNU Project, so long as the parser is configured to process the particular HLL used to code HLL program 1150. The HLL parser 1250 receives the HLL program 1150, which includes sequential source program instructions, and resolves each instruction into its component parts to produce parsed HLL 1400. The HLL parser 1250 further can determine whether the received HLL program 115 conforms to a defined standard or syntax.

The assembly generator 130 receives the parsed HLL file 1400 as input and translates it into an assembly language representation or program 1450. The particular assembly language into which the parsed HLL 1400 is translated is referred to herein as "CHiMPS". CHiMPS is an acronym that stands for "compiling HLL into massively pipelined systems". Assembly language representation 1450, being converted into the CHiMPS assembly language, is an intermediate format that, similar to the HLL program 1150, also specifies the circuit design to be developed. This intermediate format can be read by a human being and further can be edited.

The assembly language representation 1450 then can be provided to the assembler 1350. The assembler 1350 processes the assembly language representation 1450 and translates it into the netlist 1200. The assembler 1350 can be implemented as a single pass assembler, for example. Still, a preprocessor can be included which can resolve any include files and define instructions. The netlist 1200 can be a structural HDL netlist that specifies FIFOs and logic blocks. The resulting netlist 1200 can be provided directly to the synthesis tool 1100. The synthesis tool 1100 can generate a bit stream 1500 which can be downloaded into a PLD to program the device.

The CHiMPS assembly language, like conventional assembly languages, utilizes op-code mnemonics and operands. Within the CHiMPS assembly language, instructions and pseudo-instructions are used. Generally, instructions cause some type of hardware to be generated, while pseudo-instructions provide information to the assembler. Instructions correspond to predefined hardware modules and operands of instructions correspond to FIFOs or registers. In other words, the instructions of the assembly language representation typically are converted into instantiations of predefined hardware modules. The predefined hardware modules act on the operands, which are converted into FIFOs linking the hardware modules.

Pseudo-instructions provide information to the assembler to provide context to the set of instructions following the pseudo-instruction. Examples of pseudo-instructions can include, but are not limited to, reg, call, enter, and exit. Some pseudo-instructions may indirectly cause hardware to be generated, such as the reg pseudo-instruction to be described herein. The reg pseudo-instruction appears to lead to the creation of one or more FIFOs when those registers are used. The creation of the FIFOs is incidental to the instruction that creates the hardware, however, and not to the pseudo-instruction that declared the hardware.

The syntax of the reg pseudo-instruction is: reg <list of registers>. The reg pseudo-instruction tells the assembler that the named registers in the list of registers will be used in upcoming instructions. The list of registers will be created with a default width of 32 bits unless otherwise specified. The reg pseudo-instruction instructs the assembler to create FIFOs to carry the values of each register through the instructions that follow The call pseudo-instruction will cause the assembler to search for a function with a matching name. The syntax for this pseudo-instruction is: call <function name>[;[<input registers>] [;<output registers>]]. The assembler will replace the call pseudo-instruction with the entire contents of the function. Thus, rather than including a reference to the called function, a full copy of the function can be made. The input registers specify the inputs to the function and the output registers will contain the outputs of the function. Default widths for the registers can be assumed unless otherwise stated within the call pseudo-instruction.

The enter pseudo-instruction defines a function that can be called. The syntax for the enter pseudo-instruction is: enter <function name>[;<input registers>]. The input registers specified serve as placeholders for registers that will be passed into the specified function from the calling function. The exit pseudo-instruction signals the end of the function defined by the enter pseudo-instruction. Code between the enter and exit pseudo-instructions will be copied wherever the call is made. The output registers specified will define which FIFOs are to be mapped to the output registers specified on the call statement.

Instructions, as noted, typically cause hardware to be instantiated. Generally, one instruction causes one instantiation of a hardware component. Instructions are composed largely of operational instructions and flow-control instructions. Operational instructions wait for all arguments to appear on the input FIFOs. When those arguments are available, the operational instruction performs the specified function and one or more output FIFOs are provided with the result. By comparison, flow-control instructions generally split or merge the pipeline based on information from prior instructions.

Operational instructions can include, but are not limited to, integer arithmetic instructions, logical operation instructions, and floating-point arithmetic instructions. In illustration, integer arithmetic functions can include addition, subtraction, multiplication, and division, which typically take one cycle to operate. Still, more complex instructions, such as divide, can require additional cycles. Logical operation instructions can include shift operations such as logical shift right or left and arithmetic shift right or left. These operations can be handled within registers and typically require no cycles to complete.

Flow control instructions can include conditional branching and looping instructions. Examples of conditional branching instructions can include the demux, branch, unbranch, and mux instructions. The syntax of the demux instruction is: demux <muxid>;<condition>;<branch0id>;<branch1id>. The demux instruction examines the <condition>. Depending upon the value of <condition>, the instruction de-multiplexes the registers used inside the branches.

If the value of the <condition> operand is zero, then the code labeled <branch0> receives the registers, otherwise <branch1> receives the registers. The <muxid> operand is a unique identifier used to match a particular demux instruction up with both the branches and the corresponding mux instruction.

The branch instruction initiates code belonging to a specific branch as specified by the <branchid> operand of the demux instruction. The syntax of the instruction is: branch <branchid>. Branch is actually a pseudo-instruction, as no hardware is generated.

The unbranch instruction, like the branch instruction, is a pseudo-instruction. The unbranch instruction indicates the end of a particular branch. The register namespace is restored to its value prior to the most recent branch instruction with a matching <branchid>. The syntax for the unbranch pseudo-instruction is: unbranch <branchid>.

The mux instruction multiplexes the registers back together. The syntax for the mux instruction is: mux <branchid>.

Figures 8, 9, 10:
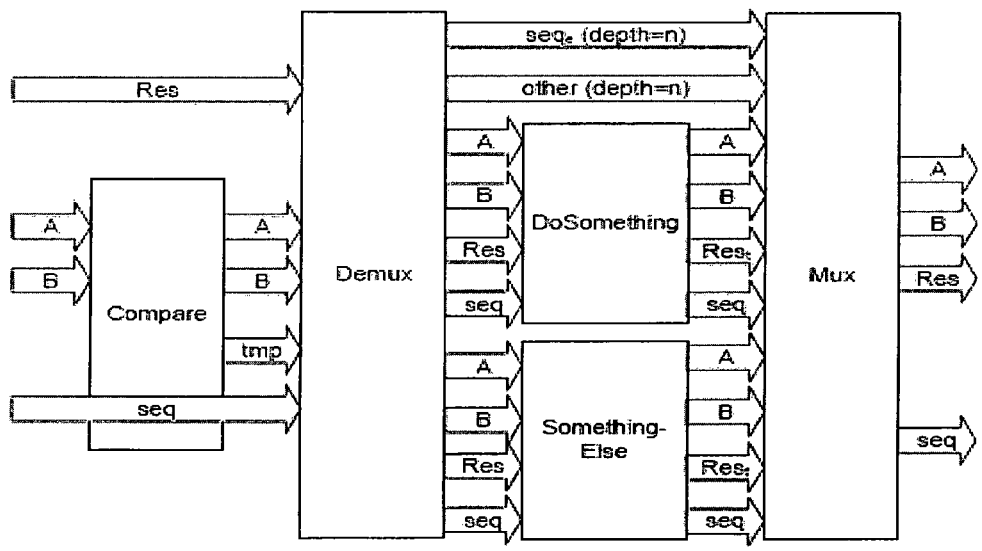
FIG. 8 illustrates an example of an HLL "if" construct.
FIG. 9 illustrates an assembly language translation of the HLL "if" construct shown in FIG. 2 in accordance with the inventive arrangements disclosed herein.
FIG. 10 is a schematic diagram illustrating a circuit design generated from the assembly language translation of FIG. 9 in accordance with the inventive arrangements disclosed herein.

FIG. 8 illustrates an example of an HLL "if" construct. A construct refers to a data structure used for a particular purpose. A construct can refer to a single programming language statement or a collection more than one statement such as a loop, method, function, or the like, where the collection has a particular function or purpose. Constructs also are defined by organizations such as the Institute of Electrical and Electronics Engineers (IEEE) and the American National Standards Institute (ANSI). These organizations set forth standards for programming languages such as C, C++, Verilog, and VHDL, with each standard defining the available constructs for a given language.

In any case, the "if" construct illustrated in FIG. 8 can be incorporated into a larger HLL programmatic representation of a hardware design. When provided to a compiler as described herein, the constructs of the HLL program can be identified and an assembly language representation in the CHiMPS assembly language can be generated. FIG. 9 illustrates the CHiMPS assembly language translation or representation of the HLL "if" construct. The CHiMPS code shown in FIG. 9 illustrates the conditional branching instructions demux, branch, unbranch, and mux described above.

From the assembly language representation shown in FIG. 9, the compiler generates a netlist. The netlist specifies the pipelined hardware configuration depicted in FIG. 10. As shown, the instructions of the assembly language representation have been transformed into hardware instantiations and the operands have become FIFOs linking the hardware instantiations. In this case, the add instruction corresponds to the compare hardware module.

The general form of a loop has three components: initialization, increment and test for exit condition, and loop body. While the initialization may appropriately be done before the loop actually starts, the other three components of the loop are executed iteratively and in order to gain maximum throughput, should happen in parallel.

The basic layout of a loop should be the following (the components of the loop are highlighted in bold text):
    initialization code
    for instruction
    test for exit
    break instruction
    loop body
    end instruction

There are three types of values (registers/FIFOs) that are active during the life of a loop. The first set includes those that enter the loop with a particular value and every time through the loop they retain that value. These are called the fixed variables (F). There are the iterator variables (I), which derive from the loop counter and change each time through the loop in some predictable way. Finally, there are results variables (Res) that typically change during the loop execution and are usually derived from a combination of the fixed variables and the iterator variables, and sometimes external memory. Results variables generally start out looking like fixed values that are set before the loop starts, and then are modified inside the loop body. An iterator register may also be a results register.

The for instruction itself doesn't recognize the difference between the register types, but just passes them through as if they are all F values; later instructions wind up making the determination and taking the correct action. The for instruction is of the form:

for <loopid>;<counter-reg>

The <loopid> is a unique identifier used to match the for with the other instructions in the loop.

Figure 11:
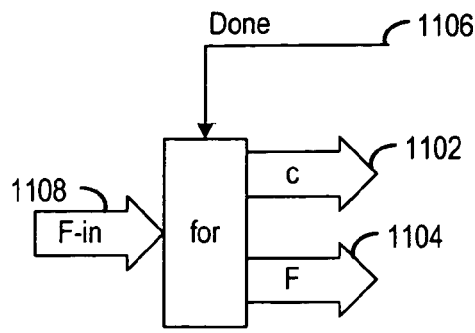
FIG. 11 is a functional block diagram of the hardware generated from a for instruction.

FIG. 11 is a functional block diagram of the hardware generated from a for instruction. The counter-register (c, 1102) and the fixed variables (F 1104) are generated on every clock cycle. Then the value of the counter-register is incremented. The same values of F are generated on every cycle until the Done signal 1106 comes in. Upon receiving the Done signal (which should be set at system start-up), the counter-register is reset to zero and new fixed registers are pulled from the F-in FIFO 1108 and stored for generating the F values on future cycles.

As long as the iterator values can be generated exclusively from the counter-register, there need be no dead cycles in the pipeline. If the iterator registers must be dependent upon prior iteration values, then they can use WAIT/SYNC, which will introduce pipeline delays.

The format of the nfor instruction is:

nfor <loopid>;<niter>;<counter-reg>

This is essentially the same as a for instruction, except that the number of iterations, specified by <niter>, is known at runtime. This means that the code containing the test for exit and the break instruction are unnecessary, as is any speculative execution of code inside the loop.

Figure 12:
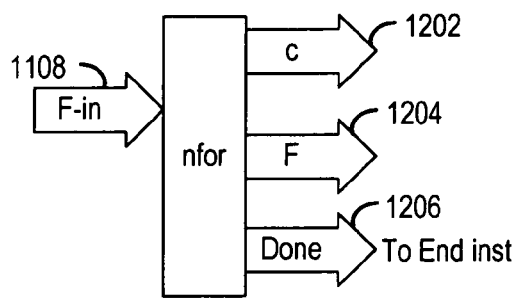
FIG. 12 is a functional block diagram of the hardware generated for an nfor instruction.

FIG. 12 is a functional block diagram of the hardware generated for an nfor instruction. The nfor instruction will increment and emit the counter (c 1202) along the F 1204 and DONE 1206 registers on every cycle. DONE will be zero until the counter is equal to niter−1, at which time it will be one.

The format of a break instruction is:

break <loopid>;<condition>

Figure 13:
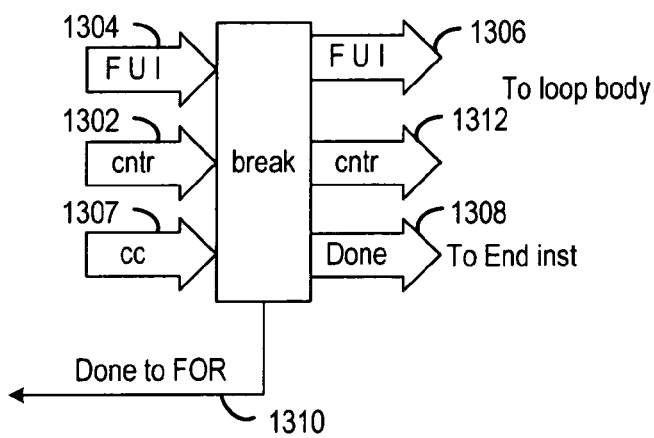
FIG. 13 is a functional block diagram of the hardware generated for a break instruction.

FIG. 13 is a functional block diagram of the hardware generated for a break instruction. The hardware waits for counter input 1302. There is a persistent DONE flag that is initialized to true. If the persistent DONE flag is true and the counter is nonzero, then all inputs 1304 are discarded. If the counter is zero, the DONE flag is reset and the input registers (without the DONE flag) are passed 1306 to the loop body. The remaining steps are skipped.

If the condition code 1307 is true (nonzero), then the DONE flag is set and passed 1308 to the END instruction, and the Done signal 1310 is sent to the FOR (note that it is the presence of data in this FIFO that indicates the operation is done, not the value). The other inputs are discarded. If neither of the previous conditions is true, then the DONE flag is passed 1308 (which will be false) to the END instruction and the input registers and counter 1312 are passed to the loop body.

The desired effect is to mirror the way the NFOR works, which is that one DONE value (in a FIFO) is sent to the END instruction along with all of the loop body registers. During iterations 0 thru N−1, the DONE value that gets sent is zero. For the final iteration, the done value is nonzero. This value being nonzero is what triggers the END to pass the body registers along rather than to throw them away. Since BREAK doesn't know at the start of the loop how many times the loop will execute, it actually doesn't pass any DONE with the registers during the 0th iteration, so that when the $N^{th}$ iteration occurs it will be able to pass the DONE flag (which now has a TRUE value) without passing the registers. Thus, in the end, the number of DONE flags matches the number of iterations (and the number of the body registers).

The format for the end loop instructions is:

end <loopid>

The end statement indicates the end of the loop defined by the for with a corresponding <loopid>. It also generates a signal back to the for instruction, telling it that the loop is done.

Figure 14:
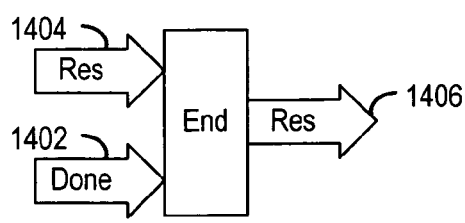
FIG. 14 is a functional block diagram that illustrates the hardware generated for an end instruction.

FIG. 14 is a functional block diagram that illustrates the hardware generated for an end instruction. Only the results from the last iteration of the loop will be passed on. The number of loop iterations may not be zero. This means that if the compiler doesn't know that the loop may not execute zero times, it must guard against that by putting a DEMUX around the FOR loop.

The end instruction waits for the DONE signal 1402 from the break instruction. If the DONE signal is zero, then the values from all registers 1404 in the loop body are discarded. If the DONE signal is nonzero, the values of the registers 1404 are passed through as results 1406 of the loop.

There are times when a value is changed inside a loop and then is expected to be used with the new value on the next iteration of the loop (this is commonly known as a loop-carried dependency). The assembler generally handles this automatically by inserting blocks that wait for data from the previous iteration of the loop. These blocks come in two different forms, which are called "wait" and "nwait", and their behavior is described below.

Wait and sync are inserted automatically by the assembler and therefore do not need to be inserted by the compiler. There are times when the compiler may wish to inform the assembler to not insert wait and sync for particular registers. This is done with the nowait instruction, which has the following syntax:

nowait <regs>

This will cause the assembler to ignore the loop-carried dependency for the registers specified within the block of code that includes the nowait. There can be loop-carried dependencies both within the test block and within the loop body and nowait will only apply to the blocks in which it resides, which allows a choice as to whether to ignore the dependency in the body, but still pay attention to it in the test.

The nwait and wait instructions de-multiplex two values of a register, one from the for or break instruction (depending on which block we are within) and one set from the final assignment to the register within the loop. The instruction selects which to pass along by checking the counter register from the innermost for instruction. If it's zero, wait and nwait will pass along value from the for (or break) instruction, otherwise it will pass the value written from the prior iteration.

One extra set of results from the final iteration of the previous execution of the loop needs to be discarded at the beginning of the second and subsequent executions of the loop (when the counter is zero).

The nwait instruction may be used in nfor loops, or when the register being passed across loop iterations is modified in the same section of the loop (either the test or the body) where it is used. In other words, nwait will not work if the register is used in the "test for exit" section and modified in the "loop body" section (if there is a BREAK instruction between the using and setting of the register). This is typically the case when the value being used to determine the exit condition is itself being modified during the loop, which is often the case in a while loop. In this situation, wait must be used.

The wait instruction behaves basically the same way that nwait behaves except that wait will need to receive the DONETOFOR signal. Once received, for every counter it receives it will output whatever values it last output until it receives a counter with a value of zero. During this period (between when it receives the done signal and when it receives the counter of zero), it receives one set of values from the previous iteration of the loop, which it will discard.

Figure 15:
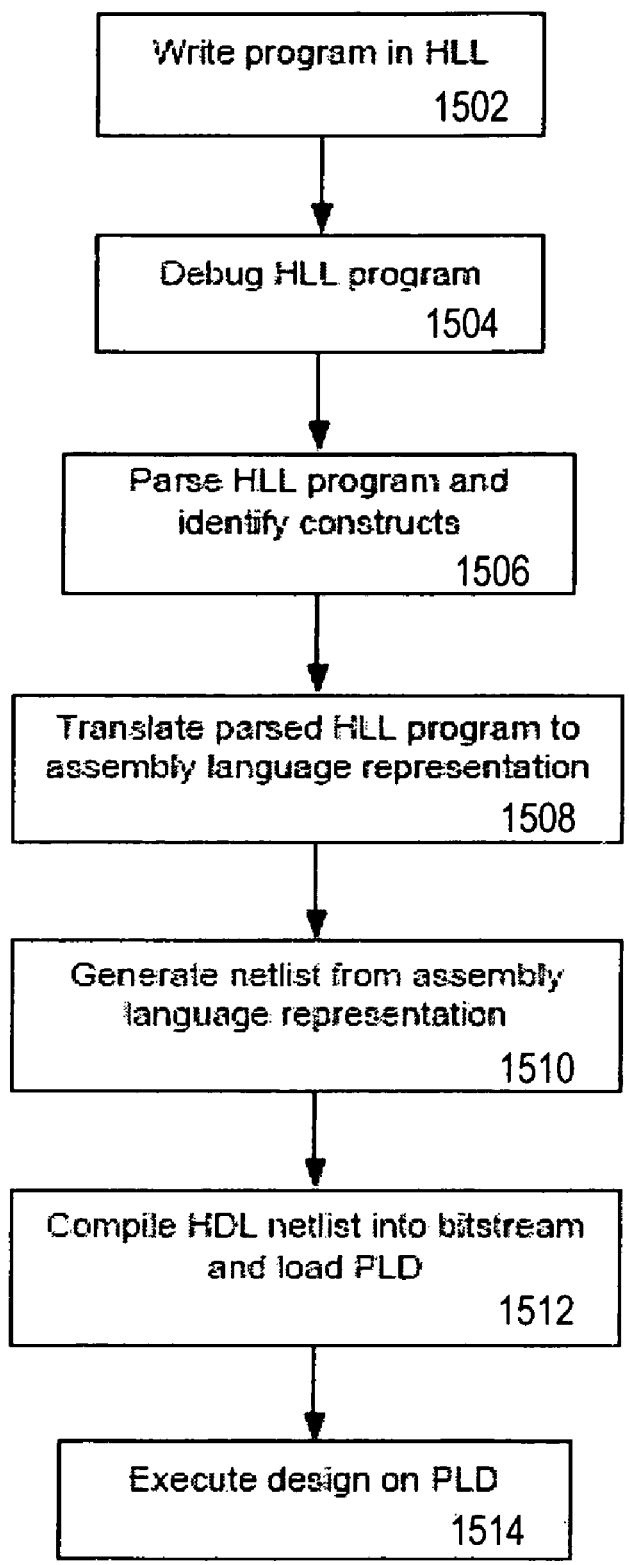
FIG. 15 is a flow chart illustrating a method of generating a circuit design from an HLL program in accordance with the inventive arrangements disclosed herein.

FIG. 15 is a flow chart illustrating a method of generating a circuit design or hardware configuration from an HLL program in accordance with the inventive arrangements disclosed herein. The method can begin in step 1502 where a program can be written in an HLL. The HLL program, generally, is an algorithmic representation of a circuit design, for example for a PLD such as an FPGA, that is to be generated from the HLL program. In step 1504, the HLL program can be debugged and/or tested.

In step 1506, the HLL program can be provided to a compiler, where the HLL program can be parsed and the various constructs of the HLL program can be identified. The parsed HLL program can be translated into an assembly language representation or program in step 1508. The assembly language used can be the CHiMPS assembly language, or another language having substantially similar functionality as described herein. The various constructs of the HLL program can be identified and mapped to associated assembly language instructions.

In step 1510, the assembly language program can be translated into a netlist specifying a hardware design. The netlist generated from the assembly language representation specifies the logic structures and signals of the design. In step 1512, the netlist can be compiled into a bitstream and loaded into a PLD. Accordingly, hardware components within the PLD can be instantiated based upon constructs and/or instructions of the assembly language program. In step 1514, the design can be executed and/or run within the PLD.

The present invention provides a solution for creating a hardware and/or circuit design from an HLL program. In accordance with the inventive arrangements disclosed herein, an HLL program can be parsed and translated into an intermediate format. The intermediate format is a variety of assembly language. The assembly language representation of the design provides designers with a more intuitive format which can be edited, as many instructions of the translated design correspond to hardware on a one-to-one basis. In any case, the assembly language representation can be converted to a netlist specifying the hardware and/or circuit design.

When a PLD is programmed with the circuit design, the design can be run. At runtime, execution threads can be identified. The execution threads can be used by the circuit design during operation to control signal flow through hardware components corresponding to looping constructs, conditional branching constructs, or any other constructs responsible for generating execution threads. Accordingly, scheduling of the circuit design can be performed based upon the execution threads identified at runtime of the circuit rather than at the time of compilation of the HLL program.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for creating combined hardware and software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for implementing a high-level programming language program in hardware and software components, comprising:

compiling the high-level programming language program into a target language program that includes a plurality of functional elements;

profiling execution of the target language program and storing profile data that specifies respective execution counts of the functional elements;

selecting a subset of the functional elements for implementation in programmable resources of a programmable device based on the profile data and availability of the programmable resources to implement functions of the subset of functional elements;

generating a bitstream that implements a first sub-circuit that performs functions of the subset of functional elements;

wherein the generating the bitstream includes generating bits that implement a first soft processor and a second soft processor on the programmable device, wherein the first soft processor in executing a first part of the target language program provides input data to the first sub-circuit, and the second soft processor executing a second part of the target language program receives output data from the first sub-circuit;

removing the subset of functional elements from the target language program;

configuring the programmable device with the bitstream; and after the removing step, providing the target language program for execution by a processor.

2. The method of claim 1, wherein the profiling includes executing an interpreter on a soft processor that is implemented in programmable resources of the programmable device.

3. The method of claim 1, wherein the selecting of the subset of functional elements comprises:

adding to the subset a functional element having a largest execution count and responsive to the execution count being greater than a threshold value;

for each functional element not in the subset, adding the functional element to the subset in response to determining that the functional element provides input data to a functional element already in the subset and the functional element not in the subset having an execution count that is greater than the threshold value; and for each functional element not in the subset, adding the functional element to the subset in response to determining that the functional element receives output from a functional element already in the subset and the functional element not in the subset having an execution count that is greater than the threshold value.

4. The method of claim 3, wherein the selecting of a subset of functional elements comprises:

determining a first quantity of the programmable resources required to implement the functions of the subset of functional elements;

comparing the first quantity to a second quantity of the programmable resources available to implement the functions of the subset of functional elements; and wherein the generating, removing, and configuring are responsive to the second quantity being greater than the first quantity.

5. The method of claim 3, further comprising:

generating a data flow graph having nodes corresponding to the functional elements in the target language program, wherein each edge that connects a first node to a second node represents that the functional element represented by the first node provides input data to the functional element represented by the second node; and wherein the determining that a functional element provides input data to another functional element and the determining that a functional element receives output from another functional element reference the data flow graph.

6. The method of claim 1, wherein the profiling includes simulating the execution of the target language program with a sample data set that is input to a processor external to the programmable device.

7. The method of claim 1, wherein the profiling includes simulating the execution of the target language program with a sample data set input to a soft processor that is implemented in the programmable resources of the programmable device.

8. The method of claim 1, wherein the profiling includes simulating the execution of the target language program with a sample data set input to a hard processor that is implemented on a single integrated circuit die with the programmable resources of the programmable device.

9. The method of claim 1, further comprising for each functional element, generating in the configuration bitstream configuration bits that implement an input FIFO buffer and an output FIFO buffer for input and output of data to and from the functional element.

10. The method of claim 1, wherein the programmable device comprises a field programmable gate array (FPGA).

11. An apparatus for implementing a high-level programming language program in hardware and software components, comprising:

means for compiling the high-level programming language program into a target language program that includes a plurality of functional elements;

means for profiling execution of the target language program and storing profile data that specifies respective execution counts of the functional elements;

means for selecting a subset of the functional elements for implementation in programmable resources of a programmable device based on the profile data and availability of the programmable resources to implement functions of the subset of functional elements;

means for generating a bitstream that implements a first sub-circuit that performs functions of the subset of functional elements;

wherein the means for generating the bitstream generates bits that implement a first soft processor and a second soft processor on the programmable device, wherein the first soft processor in executing a first part of the target language program provides input data to the first sub-circuit, and the second soft processor executing a second part of the target language program receives output data from the first sub-circuit;

means for removing the subset of functional elements from the target language program;

means for configuring the programmable device with the bitstream; and means, responsive to completion of the removing step, for providing the target language program for execution by a processor.

12. An article of manufacture, comprising:

a non-transitory processor-readable storage medium configured with processor-executable instructions for causing one or more processors to implement a high-level programming language program in hardware and software components by performing a series of steps including, compiling the high-level programming language program into a target language program that includes a plurality of functional elements;

profiling execution of the target language program and storing profile data that specifies respective execution counts of the functional elements;

selecting a subset of the functional elements for implementation in programmable resources of a programmable device based on the profile data and availability of the programmable resources to implement functions of the subset of functional elements;

generating a bitstream that implements a first sub-circuit that performs functions of the subset of functional elements;

wherein the generating of the bitstream generates bits that implement a first soft processor and a second soft processor on the programmable device, wherein the first soft processor in executing a first part of the target language program provides input data to the first sub-circuit, and the second soft processor executing a second part of the target language program receives output data from the first sub-circuit;

removing the subset of functional elements from the target language program;

configuring the programmable device with the bitstream; and after the removing step, providing the target language program for execution by a processor.

13. The article of manufacture of claim 12, wherein the selecting the subset of functional elements comprises:

adding to the subset a functional element having a largest execution count and responsive to the execution count being greater than a threshold value;

for each functional element not in the subset, adding the functional element to the subset in response to determining that the functional element provides input data to a functional element already in the subset and the functional element not in the subset having an execution count that is greater than the threshold value; and for each functional element not in the subset, adding the functional element to the subset in response to determining that the functional element receives output from a functional element already in the subset and the functional element not in the subset having an execution count that is greater than the threshold value.

14. The article of manufacture of claim 13, wherein the selecting the subset of functional elements comprises:

determining a first quantity of the programmable resources required to implement the functions of the subset of functional elements;

comparing the first quantity to a second quantity of the programmable resources available to implement the functions of the subset of functional elements; and wherein the generating, removing, and configuring are responsive to the second quantity being greater than the first quantity.

15. The article of manufacture of claim 13, wherein the series of steps further includes:

generating a data flow graph having nodes corresponding to the functional elements in the target language program, wherein each edge that connects a first node to a second node represents that the functional element represented by the first node provides input data to the functional element represented by the second node; and wherein the determining that a functional element provides input data to another functional element and the determining that a functional element receives output from another functional element reference the data flow graph.

16. The article of manufacture of claim 12, wherein the profiling includes simulating the execution of the target language program with a sample data set input to a soft processor that is implemented in the programmable resources of the programmable device.

17. The article of manufacture of claim 12, wherein the profiling includes simulating the execution of the target language program with a sample data set input to a hard processor that is implemented on a single integrated circuit die with the programmable resources of the programmable device.

18. The article of manufacture of claim 12, wherein the series of steps further includes:

for each functional element, generating in the configuration bitstream configuration bits that implement an input FIFO buffer and an output FIFO buffer for input and output of data to and from the functional element.

* * * * *